(12) United States Patent
Noma et al.

(10) Patent No.: US 11,498,290 B2
(45) Date of Patent: Nov. 15, 2022

(54) METHOD FOR MOLDING COMPOSITE MATERIAL STRUCTURE

(71) Applicant: MITSUBISHI HEAVY INDUSTRIES, LTD., Tokyo (JP)

(72) Inventors: Kazuki Noma, Tokyo (JP); Hiromichi Akiyama, Tokyo (JP); Toshio Kozasa, Tokyo (JP); Masayuki Kanemasu, Tokyo (JP); Shunichi Morishima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 88 days.

(21) Appl. No.: 17/048,804

(22) PCT Filed: Feb. 26, 2019

(86) PCT No.: PCT/JP2019/007160
§ 371 (c)(1),
(2) Date: Oct. 19, 2020

(87) PCT Pub. No.: WO2020/003609
PCT Pub. Date: Jan. 2, 2020

(65) Prior Publication Data
US 2021/0362441 A1 Nov. 25, 2021

(30) Foreign Application Priority Data
Jun. 28, 2018 (JP) .............................. JP2018-123065

(51) Int. Cl.
*B29C 70/44* (2006.01)
*B32B 3/12* (2006.01)
(Continued)

(52) U.S. Cl.
CPC .............. *B29C 70/443* (2013.01); *B32B 3/12* (2013.01); *B32B 7/12* (2013.01); *B32B 37/1018* (2013.01);
(Continued)

(58) Field of Classification Search
None
See application file for complete search history.

(56) References Cited

U.S. PATENT DOCUMENTS

| 5,242,651 A | 9/1993 | Brayden et al. |
| 9,427,943 B2 * | 8/2016 | Li ........................... B32B 5/024 |

(Continued)

FOREIGN PATENT DOCUMENTS

| JP | S5312964 A | 2/1978 |
| JP | S6219434 A | 1/1987 |

(Continued)

OTHER PUBLICATIONS

International Search Report and Written Opinoin of International Application No. PCT/JP2019/007160 dated May 7, 2019; 14pp.

*Primary Examiner* — Barbara J Musser
(74) *Attorney, Agent, or Firm* — Kanesaka Berner and Partners LLP

(57) ABSTRACT

The present invention addresses the problem of providing a method for molding, using a honeycomb core, a composite material structure that is high-quality, low cost, and leaves less voids. The present disclosure addresses the problem of providing a method for molding, using a honeycomb core, a composite material structure with which it is possible to reduce dimples in a composite material skin at low cost. According to a method for molding a composite material structure of the present disclosure, an uncured composite material honeycomb sandwich panel in which prepreg is laminated on upper and lower surfaces of a honeycomb core via an adhesive is covered with a vacuum bag and placed in an autoclave. After that, the vacuum bag is evacuated and, while the evacuation is being continued, is heated and pressurized by the autoclave to cure a matrix resin of the prepreg and achieve adhesion to the honeycomb core.

11 Claims, 8 Drawing Sheets

(51) Int. Cl.
  *B32B 7/12* (2006.01)
  *B32B 37/10* (2006.01)
  *B29L 31/30* (2006.01)
  *B61D 17/04* (2006.01)
  *B64C 1/00* (2006.01)

(52) U.S. Cl.
  CPC ..... *B29L 2031/30* (2013.01); *B32B 2305/076* (2013.01); *B32B 2605/00* (2013.01); *B61D 17/04* (2013.01); *B64C 1/00* (2013.01)

(56) References Cited

U.S. PATENT DOCUMENTS

| | | |
|---|---|---|
| 2006/0188696 A1 | 8/2006 | Grose et al. |
| 2013/0189430 A1* | 7/2013 | Shimizu .................. B32B 5/18 427/243 |
| 2019/0240876 A1* | 8/2019 | Lee ........................ B29C 70/44 |

FOREIGN PATENT DOCUMENTS

| | | | |
|---|---|---|---|
| JP | 06190955 A | * | 7/1994 |
| JP | 2004306455 A | | 11/2004 |
| JP | 2005022171 A | | 1/2005 |
| JP | 2006167981 A | | 6/2006 |
| JP | 2007015385 A | | 1/2007 |
| WO | 9725198 A1 | | 7/1997 |

* cited by examiner

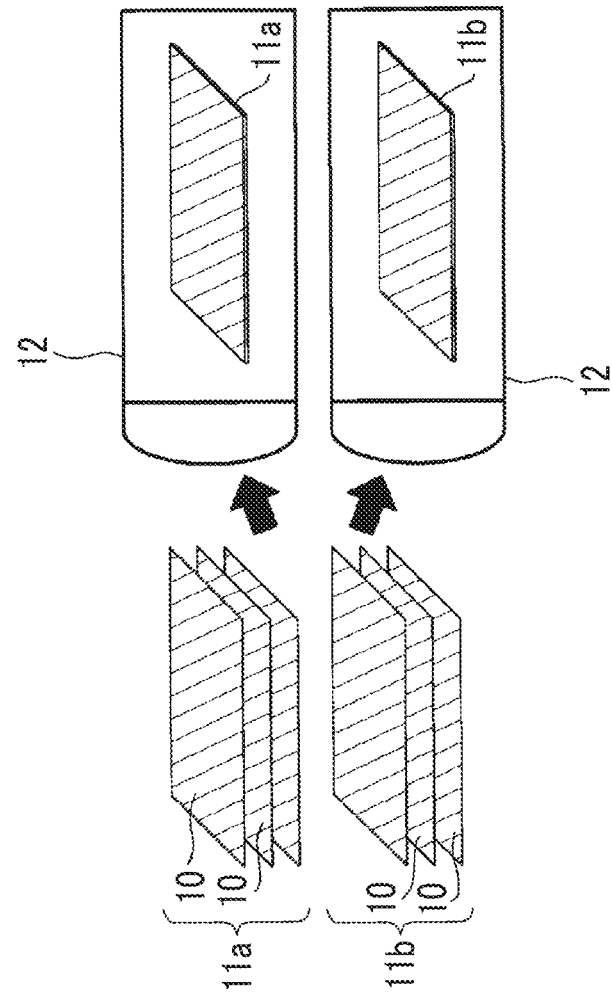

METHOD FOR MOLDING COMPOSITE MATERIAL STRUCTURE

RELATED APPLICATIONS

The present application is a National Phase of International Application Number PCT/JP2019/007160 filed Feb. 26, 2019 and claims priority to Japanese Application Number 2018-123065 filed Jun. 28, 2018.

TECHNICAL FIELD

The present disclosure related to a method for forming a composite material structure, and particularly, to a method for forming a composite material honeycomb sandwich panel applied to a control surface structure for a commercial aircraft, a panel for a helicopter/space shuttle, a floor material for an aircraft, a new traffic and railway vehicle floor material/frame material, and the like.

BACKGROUND ART

Composite material honeycomb sandwich panels are sandwich structures in which high-strength composite material skins are disposed on upper and lower surfaces of a lightweight honeycomb core (refer to Patent Document 1).

The composite material honeycomb sandwich panels are generally formed by secondary adhesion forming. The secondary adhesion forming process will be described with reference to FIGS. 6A-6C. In the secondary adhesion forming, first, prepregs 10 are laid up on a forming jig (not illustrated) to form laminates (11a, 11b) for upper and lower composite material skins. The laminates (11a, 11b) are put into an autoclave 12 in a vacuum bag state, and a matrix resin is cured using the autoclave 12 to form composite material skins (13a, 13b). The prepregs 10 are sheets in which a fiber-reinforced base material is impregnated with an uncured matrix resin.

After curing, the upper and lower surfaces of the composite material skins (13a, 13b) are roughened by sanding or the like in order to strengthen the adhesive strength with film-like adhesives (15a, 15b). The composite material skins (13a, 13b) immediately after the curing are trimmed due to erosion and the like of the matrix resin at the ends thereof. Since the matrix resin adheres to the forming jig (not illustrated), it is also necessary to perform cleaning work to remove the matrix resin.

Next, the composite material skins (13a, 13b) and the film-like adhesives (15a, 15b) are assembled to ae honeycomb core 14 to form an adhesive-uncured composite material honeycomb sandwich panel 16. The adhesive-uncured composite material honeycomb sandwich panel 16 is put into the autoclave 17 and pressurized under high temperature to cure the film-like adhesives (15a, 15b). After the curing, the composite honeycomb sandwich panel is trimmed. Additionally, the forming jig needs to be cleaned.

One-shot forming is known as another forming method for the composite honeycomb sandwich panel. A one-shot forming process will be described with reference to FIGS. 7A and 7B. In the one-shot forming, first, a honeycomb core 24, film-like adhesives (25a, 25b), and prepregs (20a, 20b) for composite material skins are laid up on a forming jig (not illustrated) to form an uncured composite material honeycomb sandwich panel 26. The uncured composite material honeycomb sandwich panel 26 in a vacuum bag state is put into an autoclave 27 to cure matrix resin of the prepregs (20a, 20b) and the film-like adhesives (25a, 25b).

For parts requiring high strength, such as aircraft structural parts, it is necessary to perform heating and pressurizing by a curing process using an autoclave to obtain high forming quality.

FIG. 8 illustrates a general curing process. In FIG. 8, the horizontal axis represents time, the vertical axis (left) represents temperature, and the vertical axis (right) represents pressure. First, the inside of the vacuum bag is evacuated, and then the inside of the autoclave is pressurized. After the inside of the autoclave is brought into a predetermined pressurized state, the autoclave is vent off and the evacuation is stopped. After that, the temperature of the inside of the autoclave is raised to the curing temperature of the matrix resin and the adhesive and held for a certain period of time.

CITATION LIST

Patent Literature

[PTL 1] Japanese Unexamined Patent Application No. 2007-15385

SUMMARY OF INVENTION

Technical Problem

In the secondary adhesion forming, since the composite material skin is usually cured under high pressure in advance, voids are unlikely to remain. However, since the secondary adhesion forming requires autoclave operation, lay-up work, curing bag work, trimming, and cleaning of the forming jig twice or more, respectively, the forming cost and work process increase.

Meanwhile, in the one-shot forming, the autoclave operation, the lay-up work, the curing bag work, the trimming, and the cleaning of the forming jig are each performed once. Therefore, compared to the secondary adhesion forming, the forming cost can be suppressed and the work process can be shortened. There is also no need for the processing of the upper and lower surfaces before the adhesion between the cured composite material skin and the film-like adhesive.

However, in the one-shot forming, the uncured composite material honeycomb sandwich panel in which the uncured prepreg 30a and the film-like adhesive 35a are combined with the honeycomb core 34 is autoclave-pressurized. When the pressurizing is performed, the matrix resin of the prepreg 30a and the viscosity of the film-like adhesive 35a decrease. When pressure is applied in a direction perpendicular to the surface of the composite honeycomb sandwich panel in that state, the prepreg 30a and the film-like adhesive 35a whose viscosity has decreased may enter the cavities 37 of the honeycomb core 34. Accordingly, the prepreg 30a and the film-like adhesive 35a on the upper and lower surfaces of the cavities 37 are sunk (dimples) 38 (refer to FIG. 9). When the dimples between the prepreg 30a and the film-like adhesive 35a are generated, the fibers of the prepreg 30a bend and the strength of the composite honeycomb sandwich panel decreases.

In Patent Document 1, in order to prevent the prepreg from being sunk into the cavities of the honeycomb core, the autoclave pressurizing is started after the adhesive is completely cured at 135° C.

The honeycomb core has a structure that is strong against the pressure in the perpendicular direction but weak against the pressure in an in-plane direction. For that reason, the pressure applied during the autoclave curing of the uncured composite material honeycomb sandwich panel is limited. In the one-shot forming, the autoclave pressurizing is performed in the state of the uncured composite material honeycomb sandwich panel in which the honeycomb core and the composite material skin are combined. However, here, it is necessary to cure the matrix resin or the like at low pressure such that the honeycomb core is not crushed. In a case where the uncured composite material honeycomb sandwich panel to which the honeycomb core is assembled is pressurized, the prepreg (40a, 40b, 40c) and the film-like adhesive 41 are pressurized on the cell walls of the cavities of the honeycomb core. However, the prepreg and the film-like adhesive 41 cannot be pressurized in the cavities. For that reason, bubbles (voids) tend to remain after the curing (refer to FIG. 10).

The present disclosure has been made in view of such circumstances, and an object thereof is to provide a method for forming, using a honeycomb core, a composite material structure having fewer remaining voids at low cost. An object of the present disclosure is to provide a method for forming, using a honeycomb core, a composite material structure that can suppress dimples in a composite material skin at a low cost.

Solution to Problem

In order to solve the above problems, the following means is adopted in the method for forming a composite material structure of the present disclosure.

The present disclosure provides a method for forming a composite material structure, the method including covering an uncured composite material honeycomb sandwich panel in which prepregs are laminated on upper and lower surfaces of a honeycomb core with a vacuum bag, disposing the uncured composite material honeycomb sandwich panel within an autoclave, and then evacuating an inside of the vacuum bag, and heating and pressurizing the uncured composite material honeycomb sandwich panel by the autoclave while the evacuation is continued to cure a matrix resin of each of the prepregs and perform adhesion of the matrix resin to the honeycomb core.

The prepregs may be laminated on the upper and lower surfaces of the honeycomb core via an adhesive.

In the related-art one-shot forming, there is a problem that the composite material skin is sunk. From this, it has been common knowledge in the technical field that the evacuation within the vacuum bag is not always applied and is stopped before the heating of the autoclave is started. Since there is a concern that the adhesive may foam, the application of the evacuation is not always adopted even in the secondary adhesion forming.

The inventors of the present application have thought that it may be possible to suppress entrainment of the volatile components into the cells and remaining of the voids if the evacuation is always applied, and have reached the present disclosure.

In the above disclosure, the uncured composite material honeycomb sandwich panel in which (the adhesive and) the prepregs are assembled to the honeycomb core is heated and pressurized by the autoclave, and the curing and adhering are performed with a single operation of the autoclave. For that reason, the adhesion pre-processing between the film-like adhesive and the composite material skin, such as the trimming, the forming jig cleaning, and sanding after the curing of the composite material skin required for the secondary adhesion, is unnecessary. Hence, as compared to the secondary adhesion forming, the forming cost can be suppressed and the working process can be shortened.

In the composite honeycomb sandwich panel, a plurality of the prepregs are laminated on the upper and lower surfaces of the honeycomb core, but voids may remain between the prepregs. In the above disclosure, not only the inside of the vacuum bag is evacuated but also the outside of the composite honeycomb sandwich panel is pressed by the autoclave, so that the voids remaining between the prepregs can be removed.

The volatile components are generated when the prepreg is heated. According to the above disclosure, by always applying the pressure of the autoclave and the vacuum pressure to the laminate, cavities (the insides of cells) of the honeycomb core becomes a vacuum, and the effect of confining the volatile components generated in the prepregs within the cells can be expected. Accordingly, a composite material structure having a high-quality composite material skin with few remaining voids.

In one aspect of the above disclosure, the method may include confirming a volatilization temperature region where a volatile component is generated from the prepreg in advance, and setting a holding temperature on the basis of the volatilization temperature region, raising a temperature of an inside of the autoclave to the holding temperature and holding the holding temperature for a predetermined time, and after the holding, raising the temperature of the inside of the autoclave to a curing temperature of the matrix resin to cure the matrix resin.

According to one aspect of the above disclosure, before heating at the curing temperature of the matrix resin, the heating is performed at a temperature equal to or lower than the curing temperature for a certain period of time. When the heating is performed at a specific temperature, the volatile components are generated from the prepreg.

Since the viscosity of the matrix resin decreases, the generated volatile components flow to the vacuum bag side or into the cells of the honeycomb core.

In a case where the adhesive that is cured at a temperature lower than that of the prepreg is used, the heating at a specific temperature increases the viscosity of the adhesive. Accordingly, dimples in the prepreg are suppressed. Hence, a composite material structure having a high-quality composite material skin with few remaining voids and dimples can be obtained.

The present disclosure provides a method for forming a composite material structure, the method including covering an uncured composite material honeycomb sandwich panel in which prepregs are laminated on upper and lower surfaces of a honeycomb core with a vacuum bag, evacuating an inside of the vacuum bag, and disposing, heating, and pressurizing the uncured composite material honeycomb sandwich panel within an autoclave, and curing a matrix resin of each of the prepregs and performing adhesion of the matrix resin to the honeycomb core. The method includes confirming a volatilization temperature region where a volatile component is generated from the prepreg in advance, and setting a holding temperature on the basis of the volatilization temperature region, raising a temperature of an inside of the autoclave to the holding temperature and holding the holding temperature for a predetermined time, and after the holding, raising the temperature of the inside of the autoclave to a curing temperature of the matrix resin to cure the matrix resin.

In one aspect of the above disclosure, the prepregs may be laminated on the upper and lower surfaces of the honeycomb core via an adhesive.

In one aspect of the above disclosure, the adhesive that is cured at a temperature lower than that of the prepreg may be used.

In one aspect of the above disclosure, preferably, a low-viscosity temperature region including a temperature at which the prepregs show a lowest viscosity is set in advance, and the temperature of the inside of the autoclave is raised to a low-viscosity temperature in the low-viscosity temperature region and held for a predetermined time before the temperature of the inside of the autoclave is raised to a curing temperature of the matrix resin after being held at the holding temperature.

When the matrix resin is held at a temperature at which the matrix resin has a low viscosity, the volatile components are more likely to migrate to the outside of the composite honeycomb sandwich panel. Accordingly, a composite material structure having a high-quality composite material skin with few remaining voids is obtained.

In one aspect of the above disclosure, in a case where a plurality of the volatilization temperature regions where volatile components are generated from the prepregs are present, in a lowest low-volatilization temperature region, an upper limit temperature or a near-upper-limit temperature of the low-volatilization temperature region may be set as a low holding temperature, and in a high-volatilization temperature region overlapping a temperature region where a viscosity of the prepregs changes so as to increase, a lower limit temperature or a near-lower-limit temperature of the high-volatilization temperature region may be set as a high holding temperature, and temperature raising and holding of the inside of the autoclave are performed in order of the low holding temperature and the high holding temperature.

There is a case where a plurality of volatilization temperature regions are present depending on the type of matrix. In such a case, the holding temperature may be set for each volatilization temperature region. For each set holding temperature, temperature raising and holding of the inside of the autoclave are is performed in order from the lowest. At a low holding temperature, the volatile components are released from the prepreg due to the low viscosity of the matrix resin. At a high holding temperature, the viscosity of the matrix resin is increasing, so it is possible to suppress the generation of the volatile components. Accordingly, a composite material structure having a high-quality composite material skin with few remaining voids is obtained.

Advantageous Effects of Invention

According to the present disclosure, by continuing the evacuation within the vacuum bag during the heating and pressurizing by the autoclave, it is possible to form the composite material structure including the honeycomb core and having fewer remaining voids than before at low cost. According to the present disclosure, by holding a temperature at which the volatile components are generated for a certain period of time before the prepreg is cured, the composite material structure including the honeycomb core, having fewer remaining voids than before, and having suppressed dimples can be formed at low cost.

BRIEF DESCRIPTION OF DRAWINGS

FIGS. 6A, 6B and 6C are views illustrating a secondary adhesion forming process.

DESCRIPTION OF EMBODIMENTS

First Embodiment

In the present embodiment, a composite material structure is formed by the following procedure.

(S1) First, an uncured composite material honeycomb sandwich panel is covered with a vacuum bag and disposed within an autoclave. The uncured composite material sandwich panel is a laminate in which uncured prepregs are laminated on upper and lower surfaces of a honeycomb core via an adhesive. The uncured composite material sandwich panel is on a forming jig. The uncured composite material sandwich panel together with the forming jig is covered with a vacuum bag. In a case where the prepregs satisfy the required adhesive capacity, the adhesive may be omitted.

(S2) Next, the inside of the vacuum bag is evacuated by a vacuum pump.

The vacuum pressure within the vacuum bag is 0 kPa (G) to −101 kPa (G), preferably −70 kPa (G) to −101 kPa (G).

Figure 1A:
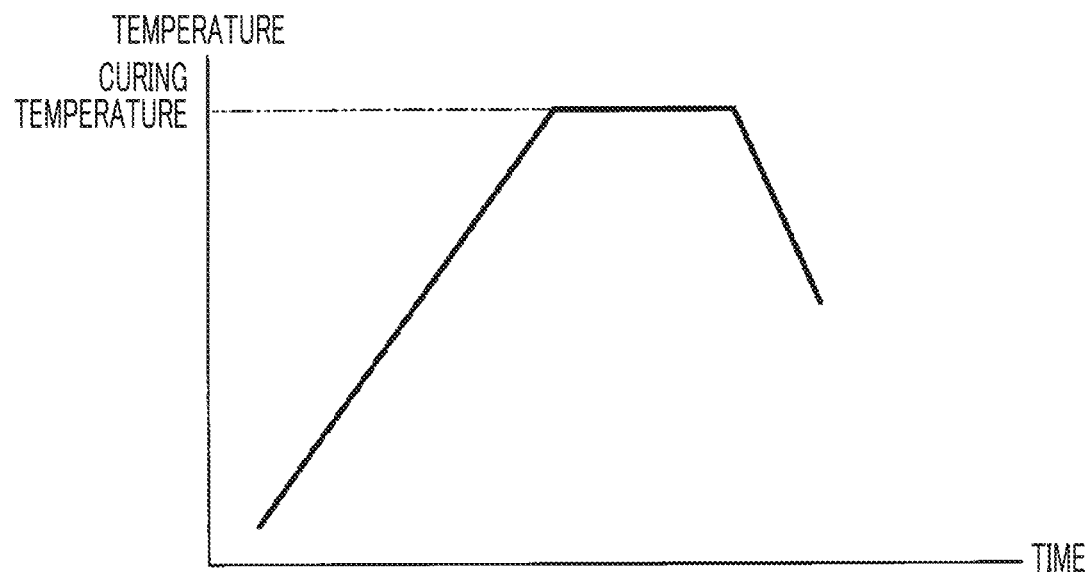
FIGS. 1A and 1B are views illustrating changes in temperature and pressure during forming in a first embodiment.
Figure 1B:
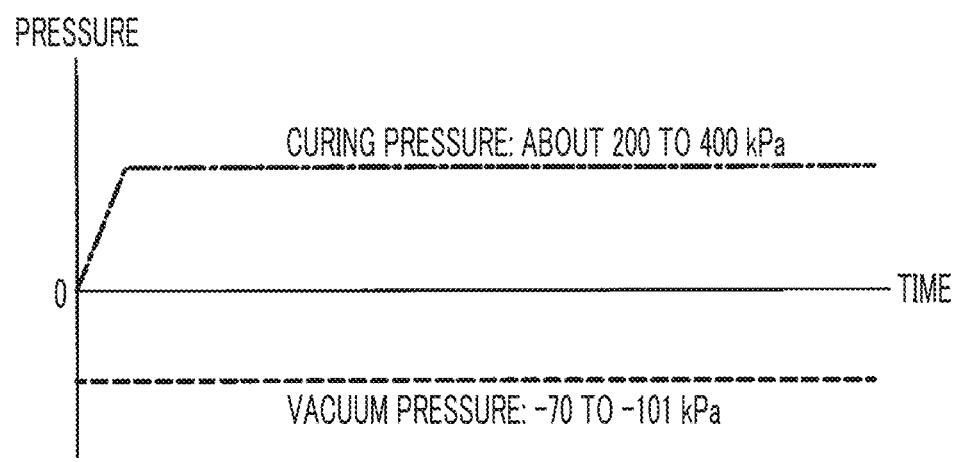

(S3) Next, as illustrated in FIGS. 1A and 1B, the uncured composite material sandwich panel is heated and pressurized by the autoclave while continuing the evacuation.

FIGS. 1A and 1B are graphs illustrating changes in temperature and pressure during forming. FIG. 1A illustrates the temperature changes within the autoclave. In FIG. 1A, the horizontal axis represents time and the vertical axis represents temperature. FIG. 1B illustrates changes in the pressure within the autoclave and the vacuum pressure within the vacuum bag. In FIG. 1B, the horizontal axis represents time and the vertical axis represents (gauge) pressure.

The pressure within the autoclave is 200 kPa (G) to 400 kPa (G).

The heating is performed by raising the temperature of a matrix resin to a curing temperature and then holding the curing temperature for a predetermined time. After being maintained for a predetermined time, the adhesive and the matrix resin are completely cured. Accordingly, a composite material structure (cured composite material sandwich panel) in which a composite material skin is adhered to the honeycomb core via an adhesive layer is obtained.

Figure 2:
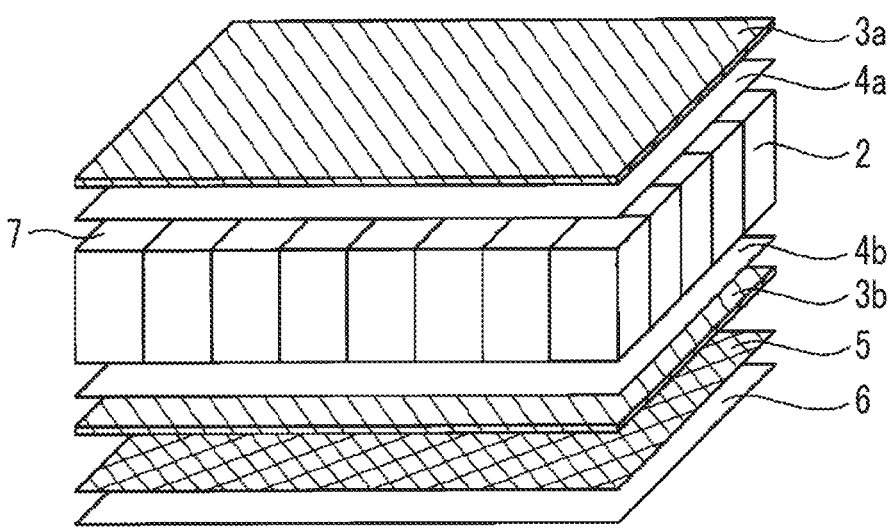
FIG. 2 is an exploded perspective view illustrating an example of an uncured composite material honeycomb sandwich panel.

FIG. 2 is an exploded perspective view illustrating an example of the uncured composite material honeycomb sandwich panel.

The uncured composite material honeycomb sandwich panel 1 illustrated in FIG. 2 has a configuration in which a honeycomb core 2, prepregs 3a and 3b disposed on both upper and lower surfaces of the honeycomb core, adhesives 4a and 4b disposed between the honeycomb core 2 and the prepregs 3a and 3b, a lightning protection mesh 5 disposed on outer upper and lower surfaces of the adhesive 4b on the lower surface side, and an adhesive 6 for adhering the lightning protection mesh 5 to the prepreg 3b on the lower surface side are laminated. The lightning protection mesh 5 and the adhesive 6 for bonding the same may be omitted. The uncured composite material honeycomb sandwich panel 1 may include a prepreg other than the above.

The honeycomb core 2 is a core material having honeycomb-shaped cavities 7 (honeycomb structure). The honeycomb core 2 is an aluminum honeycomb, an aramid honeycomb, a paper honeycomb, or the like. The shape of each cavity 7 is not particularly limited. The size of the cavity 7 is not particularly limited. The thickness of the honeycomb core 2 is not particularly limited.

The prepregs 3a and 3b include reinforcing fibers and an uncured matrix resin. The reinforcing fibers are carbon fibers, glass fibers, aramid fibers, or the like. The matrix resin is a thermosetting resin. More specifically, the thermosetting resin is epoxy, unsaturated polyester, vinyl ester, bismaleimide, phenol, cyanate, polyimide, or the like. The composite material skin of the composite material structure is formed by curing the matrix resin of the prepregs 3a and 3b. Although only one prepreg is not illustrated in FIG. 2, a plurality of prepregs may be laminated to realize the required thickness.

The adhesives 4a and 4b are film-like adhesives, paste adhesives, or the like that contain an uncured thermosetting resin. The thermosetting resin is, for example, epoxy, acrylic, polyurethane, or the like. As the adhesives 4a and 4b, materials that are cured at a temperature equal to or lower than the matrix resin of the prepreg are selected. For the adhesives 4a and 4b, it is preferable to select a material that is cured at a temperature lower than that of the matrix resin. The composite material structure obtained by curing the thermosetting resin serves as the adhesive layer for bonding the honeycomb core and the composite material skin.

The lightning protection mesh 5 is made of metal or plastic. The metal is copper, aluminum, nickel, stainless steel, silver, titanium, or the like. The plastic is nylon, polyester, PVC, or the like.

The adhesive 6 for bonding the lightning protection mesh 5 is a film-like adhesive or the like that contains the thermosetting resin. The thermosetting resin is epoxy, acrylic, polyurethane, or the like.

The vacuum bag is made of nylon, polyimide, or the like. The vacuum bag is configured to be connectable to the vacuum pump so that the inside of the vacuum bag can be reduced in pressure.

The autoclave means a pressure-resistant device or container capable of bringing the inside thereof into a high pressure, or processing performed using the device. Nitrogen gas or the like is used for the pressurizing.

In the honeycomb sandwich panel forming, the vacuum pressure is generally not applied during the heating. However, in the present embodiment, pressure and full vacuum are always applied during the curing of the matrix resin in order to remove the voids. Accordingly, it is possible to vacuum the inside of each cell of the honeycomb core to confine volatile components within the cells of the honeycomb core. According to the forming method of the present embodiment, it is possible to obtain the composite material structure in which the remaining of the voids are suppressed as compared to a case where the forming is performed without continuing the evacuation.

Second Embodiment

Figure 3A:
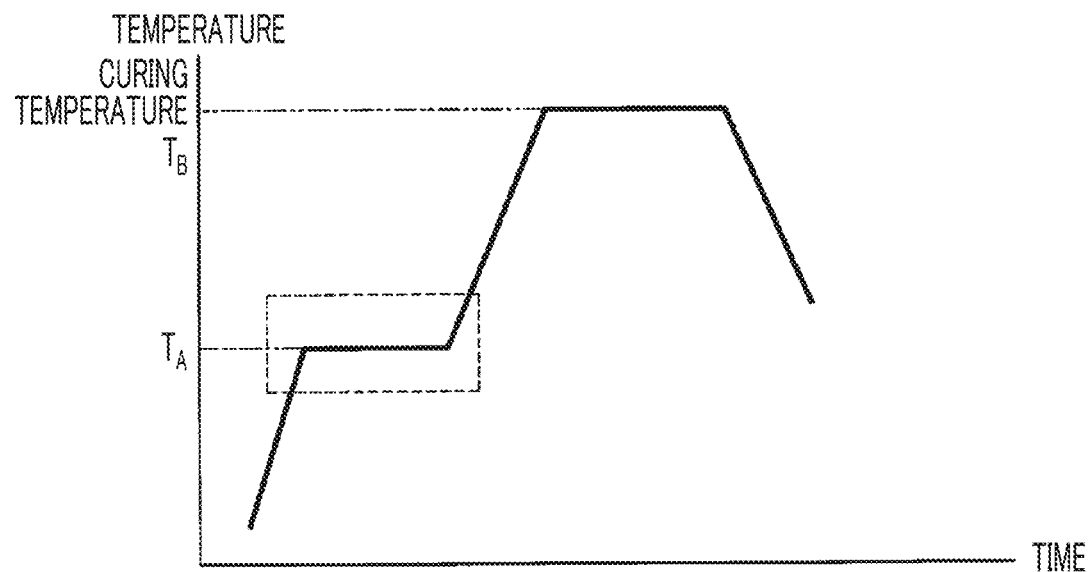
FIGS. 3A and 3B are views illustrating changes in temperature and pressure during forming in a second embodiment.
Figure 3B:
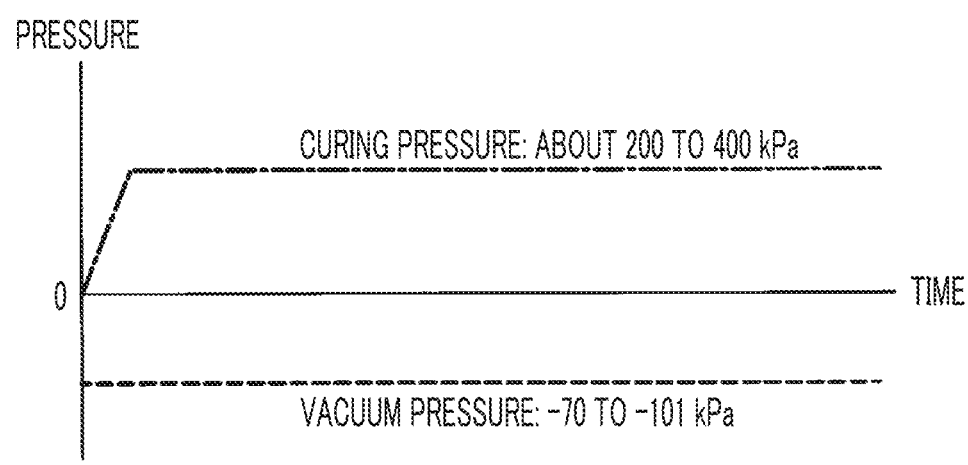

FIGS. 3A and 3B are graphs illustrating changes in temperature and pressure during forming in the present embodiment. FIG. 3A illustrates temperature changes within the autoclave. In FIG. 3A, the horizontal axis represents time and the vertical axis represents temperature. FIG. 3B illustrates the pressure within the autoclave and the vacuum pressure within the vacuum bag. In FIG. 3B, the horizontal axis represents time and the vertical axis represents (gauge) pressure.

In the present embodiment, a composite material structure is formed by the following procedure.

(Preparation) The volatilization temperature region where the volatile components are generated from the prepreg is confirmed in advance, and the holding temperature ($T_A$) is set on the basis of the volatilization temperature region.

The volatilization temperature region can be confirmed by the thermogravimetric measurement (TGA) of the same type of prepreg. The volatilization temperature region is from the temperature at which the weight change of the prepreg starts to occur to the temperature at which the weight change converges. A case where the weight continues to change by 0.05% or more is defined as a "change". When the weight starts to change, the change is determined to be 0.05% or more. The "convergence" is determined to occur at a point where the rate of change in weight becomes ±0.01% or less. The volatilization temperature region to be used for setting the holding temperature ($T_A$) is lower than a temperature at which the prepreg (matrix resin) shows a lowest viscosity. In setting the holding temperature ($T_A$), a first volatilization temperature region where a weight change occurs when the prepreg is heated and pressurized is preferentially used. The holding temperature ($T_A$) may be set to a temperature within the range of the first volatilization temperature region, preferably to the upper limit temperature of the temperature region.

(S11) First, an uncured composite material honeycomb sandwich panel, in which prepregs are laminated on the upper and lower surfaces of a honeycomb core via an adhesive, is covered with a vacuum bag and disposed within the autoclave. Here, the uncured composite material honeycomb sandwich panel is on the forming jig, and together with the forming jig, the uncured composite material honeycomb sandwich panel is covered with the vacuum bag.

(S12) Next, similarly to S2) of the first embodiment, the inside of the vacuum bag is evacuated by the vacuum pump.

(S13) Next, as illustrated in FIGS. 3A and 3B, the uncured composite material honeycomb sandwich panel is heated and pressurized by the autoclave.

The uncured composite material honeycomb sandwich panel has the same laminated configuration as in the first embodiment. For the adhesive, a material that is cured at a temperature equal to or lower than the matrix resin of the prepreg is selected. For the adhesive, a material that is cured at a temperature lower than the matrix resin of the prepreg and higher than the holding temperature ($T_A$) may be selected.

The evacuation may be continued during the heating and pressurizing.

The pressure within the autoclave is the same as in the first embodiment.

In the present embodiment, the heating in the above (S13) includes two steps.

Step (A):

After the temperature is raised to the holding temperature ($T_A$) at 10° C./min or less, preferably 0.1° C./min or more and 3° C./min or less, the holding temperature (TA) is held for a predetermined time. Here, the "predetermined time" is the time until the volatile components can be removed, and the time until the viscosity of the adhesive increases in a case where suppressing dimples is aimed at by increasing the viscosity of the adhesive.

Step (B):

After Step (A), a curing temperature $T_B$ of the matrix resin is raised to 10° C./min or less, preferably 0.1° C./min or more and 3° C./min or less, and the curing temperature ($T_B$) is held for a predetermined time. Accordingly, the adhesive and the matrix resin are completely cured. Accordingly, a composite material structure (uncured composite material honeycomb sandwich panel) in which the composite material skin is bonded to the honeycomb core via the adhesive layer is obtained.

The holding temperature ($T_A$) is lower than the temperature at which the prepreg shows the lowest viscosity. Meanwhile, the adhesive is cured at a temperature lower than that of the prepreg. By holding the holding temperature ($T_A$), the viscosity of the adhesive increases before the prepreg reaches the lowest viscosity. Accordingly, the matrix resin can be prevented from being entrained into the cells of the honeycomb core.

While the holding time ($T_A$) is held, the generated volatile components are removed out of the composite material sandwich panel. In a case where the evacuation is continued, an effect of entraining a portion of the generated volatile components into the cells of the honeycomb core can be expected. Additionally, in a case where the curing temperature of the adhesive is higher than the holding temperature ($T_A$), the adhesive is not completely cured, though the viscosity of the adhesive rises. Hence, in such a case, an effect of entraining a portion of the generated volatile components into the cells of the honeycomb core can also be expected.

For example, as the prepreg, in a case where the carbon fibers are used for the reinforcing fibers and epoxy resin is used for the matrix resin, it is confirmed that the volatile components can be removed by maintaining the holding temperature ($T_A$) at a low temperature of 70° C. to 90° C. for 1 hour or more.

According to the forming method of the present embodiment, it is possible to obtain a composite material structure in which dimples in the composite material skin are suppressed while preventing voids from remaining.

Third Embodiment

Figure 4A:
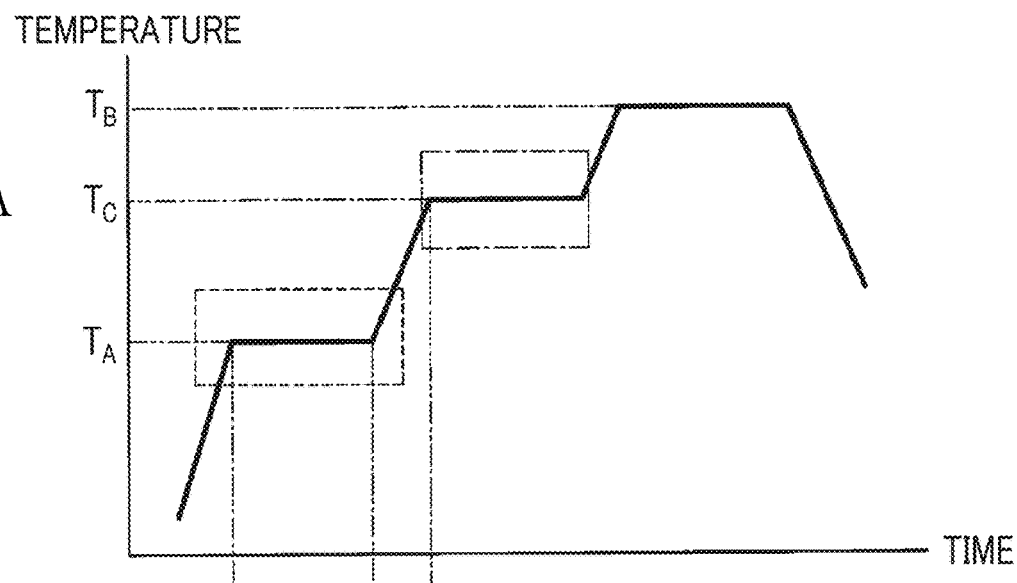
FIGS. 4A and 4B are graphs illustrating changes in temperature and viscosity of an adhesive and a prepreg during forming in a third embodiment.
Figure 4B:
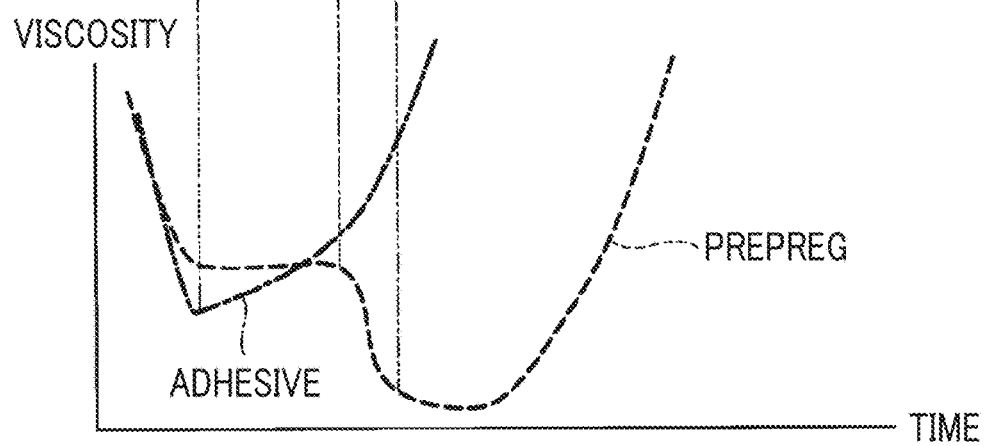

FIGS. 4A and 4B are graphs illustrating changes in temperature and viscosity of an adhesive and a prepreg during forming in the present embodiment. FIG. 4A illustrates temperature changes within the autoclave. In FIG. 4A, the horizontal axis represents time and the vertical axis represents temperature. FIG. 4B illustrates changes in the viscosity of the adhesive and the prepreg. In the figure, the horizontal axis represents time and the vertical axis represents viscosity.

In addition to the second embodiment, the present embodiment further includes Step (C) of holding a low-viscosity temperature ($T_C$).

Step (C):

Heating is performed after Step (A) and before Step (B). In Step (C), the temperature of the inside of the autoclave is raised to the low-viscosity temperature ($T_C$), and the low-viscosity temperature (Tc) is held for a predetermined time. As for the predetermined times, 30 minutes to 2 hours for which the low-viscosity range can be held serves as an indication.

The low-viscosity temperature ($T_C$) is in the low-viscosity temperature region including the temperature at which the prepreg shows the lowest viscosity. The temperature showing the lowest viscosity of the prepreg can be confirmed in advance by dynamic viscoelasticity measurement (DMA) of the prepreg. The low-viscosity temperature ($T_C$) may be equal to the lowest viscosity and is preferably lower than the temperature showing the lowest viscosity. The low-viscosity temperature ($T_C$) may be a temperature at which the viscosity of the prepreg can be maintained for a certain period of time, or a temperature while the viscosity of the prepreg changes in a decreasing direction. The low-viscosity temperature region is a temperature region where the volatile components of the resin can be degassed. In the low-viscosity temperature region, a difference between an upper limit temperature and a lower limit temperature can be set to a width of 10° C. to 50° C., preferably 20° C. to 30° C.

For example, in a case where the carbon fibers are used for the reinforcing fibers as the prepreg and the epoxy resin is used for the matrix resin, it is confirmed that the volatile components can be removed by maintaining the low-viscosity temperature ($T_C$) of 100° C. to the high temperature of 140° C. for 30 minutes to 1 hour.

In a state where the viscosity of the prepreg is low, the volatile components are likely to escape to the outside of the prepreg. By holding such a state for a certain period of time, the volatile components can be removed. Meanwhile, the low-viscosity temperature ($T_C$) is higher than the holding temperature ($T_A$). Hence, the adhesive that has been cured as the curing reaction progresses further prevents the matrix resin from entering the honeycomb core side.

According to the forming method of the present embodiment, it is possible to obtain a composite material structure in which no voids remain or the dimples of the composite material skin are suppressed.

Fourth Embodiment

The present embodiment is different from the second embodiment in that a plurality of holding temperatures are set at the stage of Step (A) (Step A').

Figure 5A:
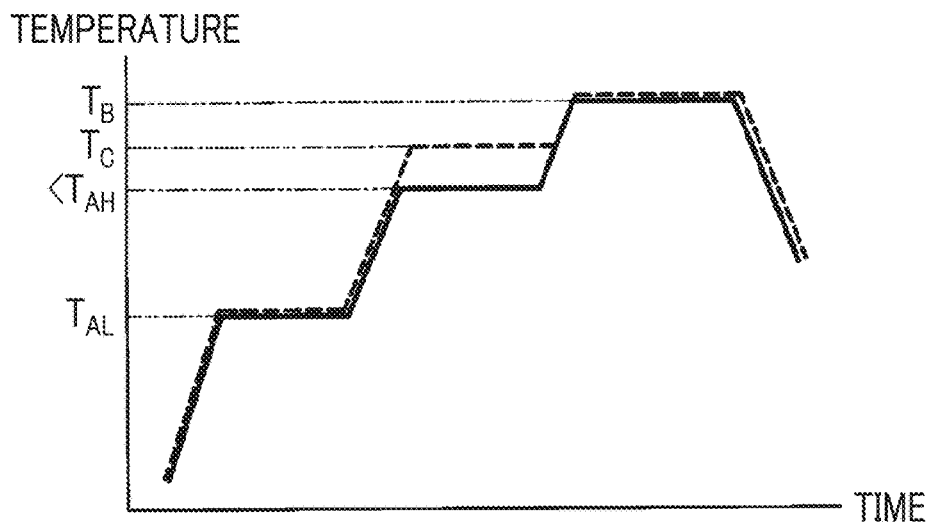
FIGS. 5A, 5B, and 5C are views illustrating changes in temperature and weight and viscosity of the prepreg during forming in a fourth embodiment.
Figure 5B:
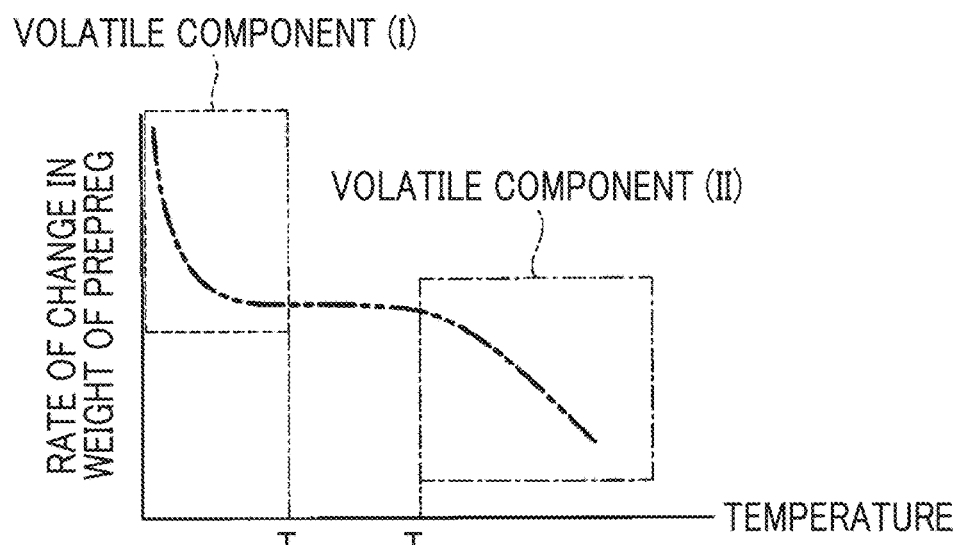
Figure 5C:
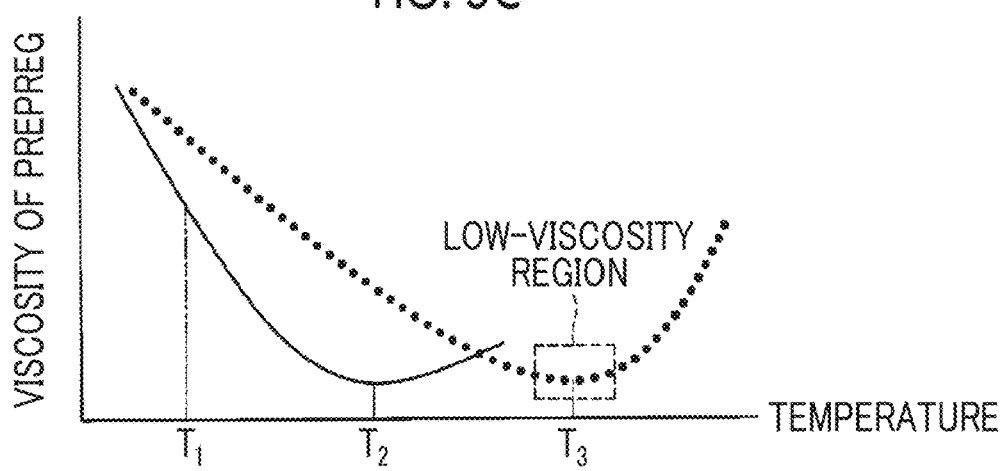
Figure 7A:
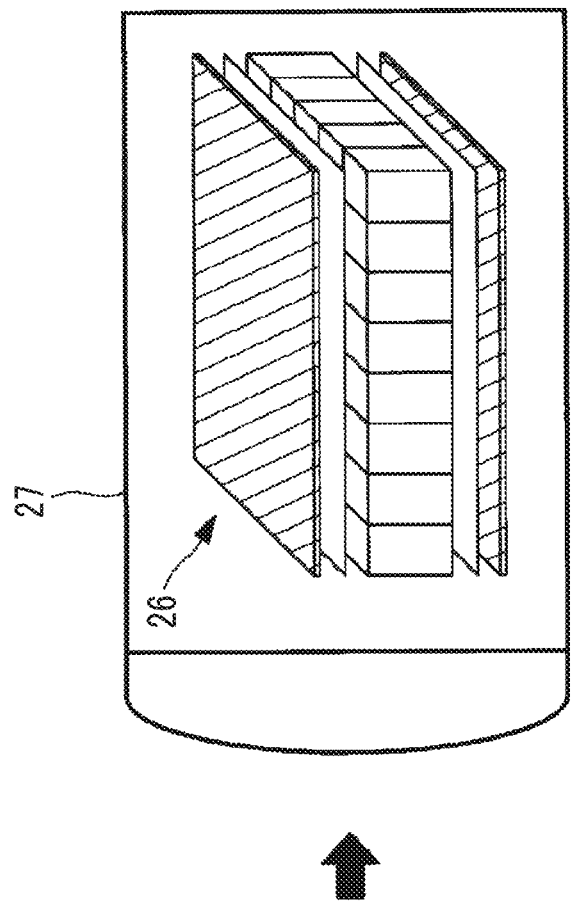
FIGS. 7A and 7B are views illustrating a one-shot forming process.
Figure 7B:
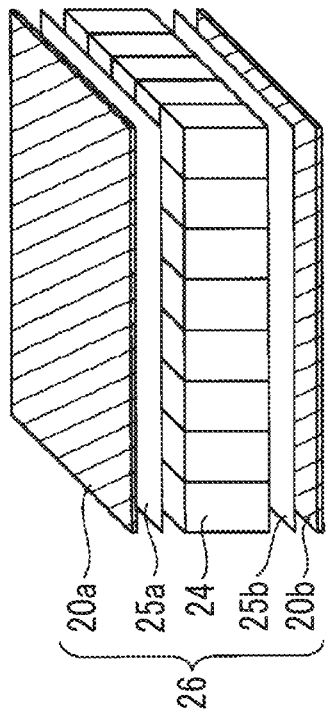
Figure 8:
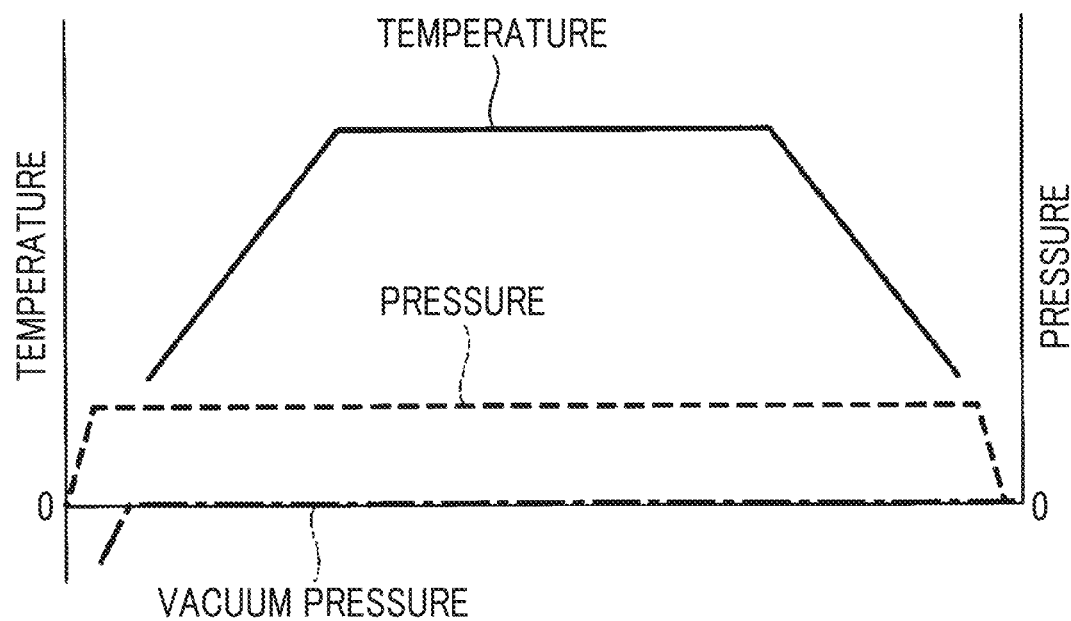
FIG. 8 is a view illustrating a general curing process.
Figure 9:
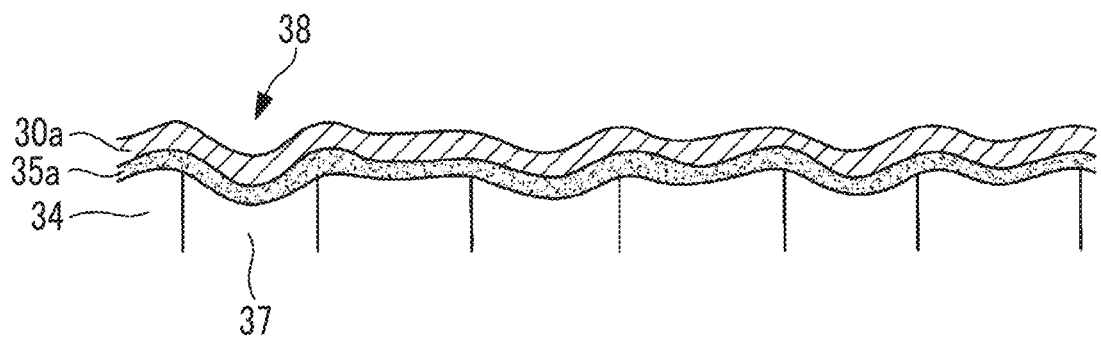
FIG. 9 is a schematic partial cross-sectional view of a composite material structure and a honeycomb core.
Figure 10:
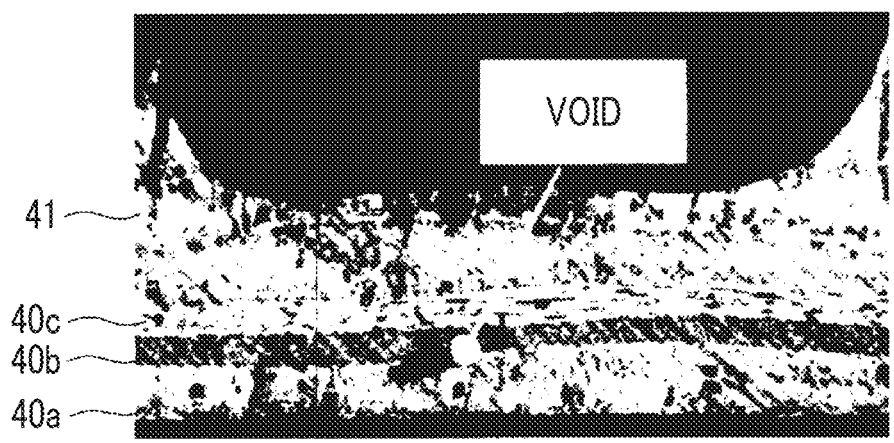
FIG. 10 is a cross-sectional photograph illustrating a composite material skin.

FIGS. 5A to 5C are graphs illustrating changes in temperature, weight, and viscosity of a prepreg during forming in the present embodiment. FIG. 5A illustrates the temperature changes within the autoclave. In FIG. 5A, the horizontal axis represents time and the vertical axis represents temperature. FIG. 5B illustrates the rate of change in weight of the prepreg. In FIG. 5B, the horizontal axis represents temperature and the vertical axis represents the rate of change in weight of the prepreg. FIG. 5C illustrates changes in the viscosity of the prepreg. In FIG. 5C, the horizontal axis represents temperature and the vertical axis represents viscosity.

Depending on the type of prepreg to be used, there is a case where there are a plurality of the volatilization temperature regions where the volatile components are generated. For example, the prepreg in FIG. 5B has a volatilization temperature region where a volatile component (I) is generated and a volatilization temperature region where a volatile component (II) is generated. In a case where such a prepreg is used, the holding temperature is set as follows.

Step (A'):

In a lowest volatilization temperature region (low-volatilization temperature region), an upper limit temperature or a near-upper-limit temperature of the low-volatilization temperature region is set to the low-temperature-side holding temperature (low holding temperature $T_{AL}$). The "nearupper-limit temperature" allows an upper limit temperature of −2° C. The "near-upper-limit temperature" allows an upper limit temperature of +2° C. The low holding temperature is preferably the upper limit temperature of the low-volatilization temperature region.

In a volatilization temperature region (high-volatilization temperature region) overlapping a temperature region where the viscosity of the prepreg changes so as to increase, a lower limit temperature or a near-lower-limit temperature of the volatilization temperature region is set to a high-temperature-side holding temperature (high holding temperature $T_{AH}$). The "near-lower-limit temperature region" allows a lower limit temperature of +2° C. The "near-lower-limit temperature" allows a lower limit temperature of −2° C. or higher. The high holding temperature is preferably lower than a temperature at which the volatile components that may be generated in the high-volatilization temperature region start to appear.

After the temperature is raised to the low holding temperature ($T_{AL}$) at 10° C./min or less, preferably 0.1° C./min or more and 3° C./min or less, the holding temperature ($T_{AL}$) is held for a predetermined time. Here, the "predetermined time" is preferably 30 minutes or more.

After the low holding temperature ($T_{AL}$) is held for a predetermined time, the temperature is raised to the high holding temperature ($T_{AH}$) at 10° C./min or less, preferably 0.1° C./min or more and 3° C./min or less, and then, the high holding temperature ($T_{AH}$) is held for a predetermined time. Here, the "predetermined time" is preferably 30 minutes or more.

Additionally, the viscosity behavior of the prepreg is different depending on the type of prepreg used (refer to FIG. 5C). In a case where the lower limit temperature of the high-volatilization temperature region is close to a temperature showing the lowest viscosity of the prepreg, the third embodiment may be preferentially implemented.

According to the present embodiment, the viscosity of the prepreg decreases while being held at the low holding temperature ($T_{AL}$). Hence, the volatile components are likely to escape. The high-volatilization temperature region is higher than the low-volatilization temperature region. Hence, in the high-volatilization temperature region, the curing reaction of the adhesive progresses, and the adhesive is brought into a harder state. Accordingly, the matrix resin can be prevented from being entrained into the cells of the honeycomb core. Moreover, by holding the matrix resin at a high holding temperature to cure the matrix resin, the generation of new volatile components can be prevented. As a result, the remaining of the voids can be avoided.

In addition, the above first to third embodiments may be implemented in combination.

Additionally, the heating including the above Step (A), Step (B), Step (C), and Step (A') may be controlled by a control unit of the autoclave.

The control unit includes, for example, a central processing unit (CPU), a random access memory (RAM), a read-only memory (ROM), and a computer-readable storage medium. A series of processing for realizing various functions are stored in a storage medium or the like in the form of a program as an example, and the CPU reads the program into the RAM or the like to execute information processing and arithmetic processing, thereby realizing various functions. In addition, as the program, a form in which the program is installed in the ROM or other storage media in advance, a form in which the program is provided in a state of being stored in the computer-readable storage medium, a form in which the program is distributed via wired or wireless communication means, or the like may be applied. The computer-readable storage medium is a magnetic disk, a magneto-optical disk, a CD-ROM, a DVD-ROM, a semiconductor memory, or the like.

The invention claimed is:

1. A method for forming a composite material structure, the method comprising:
   covering an uncured composite material honeycomb sandwich panel in which prepregs are laminated on upper and lower surfaces of a honeycomb core with a vacuum bag, disposing the uncured composite material honeycomb sandwich panel within an autoclave, and then evacuating an inside of the vacuum bag,
   heating and pressurizing the uncured composite material honeycomb sandwich panel by the autoclave while the evacuation is continued to cure a matrix resin of each of the prepregs and perform adhesion of the matrix resin to the honeycomb core,
   confirming a volatilization temperature region where a volatile component is generated from the prepreg in advance, and setting a holding temperature on the basis of the volatilization temperature region,
   raising a temperature of an inside of the autoclave to the holding temperature and holding the holding temperature for a predetermined time, and
   after the holding, raising the temperature of the inside of the autoclave to a curing temperature of the matrix resin to cure the matrix resin,
   wherein a low-viscosity temperature region including a temperature at which the prepregs show a lowest viscosity is set in advance, and
   wherein the temperature of the inside of the autoclave is raised to a low-viscosity temperature in the low-viscosity temperature region and held for a predetermined time before the temperature of the inside of the autoclave is raised to a curing temperature of the matrix resin after being held at the holding temperature.

2. The method for forming a composite material structure according to claim 1,
   wherein the prepregs are laminated on the upper and lower surfaces of the honeycomb core via an adhesive.

3. The method for forming a composite material structure according to claim 2,
   wherein the adhesive that is cured at a temperature lower than that of the prepregs is used.

4. A method for forming a composite material structure, the method comprising covering an uncured composite material honeycomb sandwich panel in which prepregs are laminated on upper and lower surfaces of a honeycomb core with a vacuum bag, evacuating an inside of the vacuum bag, and disposing, heating, and pressurizing the uncured composite material honeycomb sandwich panel within an autoclave, and curing a matrix resin of each of the prepregs and performing adhesion of the matrix resin to the honeycomb core,
   the method comprising:
   confirming a volatilization temperature region where a volatile component is generated from the prepreg in advance, and setting a holding temperature on the basis of the volatilization temperature region,
   raising a temperature of an inside of the autoclave to the holding temperature and holding the holding temperature for a predetermined time, and
   after the holding, raising the temperature of the inside of the autoclave to a curing temperature of the matrix resin to cure the matrix resin, wherein a low-viscosity temperature region including a temperature at which the prepregs show a lowest viscosity is set in advance, and wherein the temperature of the inside of the autoclave is raised to a low-viscosity temperature in the low-viscosity temperature region and held for a predetermined time before the temperature of the inside of the autoclave is raised to a curing temperature of the matrix resin after being held at the holding temperature.

5. The method for forming a composite material structure according to claim 4, wherein the prepregs are laminated on the upper and lower surfaces of the honeycomb core via an adhesive.

6. The method for forming a composite material structure according to claim 5, wherein the adhesive that is cured at a temperature lower than that of the prepregs is used.

7. A method for forming a composite material structure, the method comprising:

covering an uncured composite material honeycomb sandwich panel in which prepregs are laminated on upper and lower surfaces of a honeycomb core with a vacuum bag, disposing the uncured composite material honeycomb sandwich panel within an autoclave, and then evacuating an inside of the vacuum bag, heating and pressurizing the uncured composite material honeycomb sandwich panel by the autoclave while the evacuation is continued to cure a matrix resin of each of the prepregs and perform adhesion of the matrix resin to the honeycomb core, confirming a volatilization temperature region where a volatile component is generated from the prepreg in advance, and setting a holding temperature on the basis of the volatilization temperature region, raising a temperature of an inside of the autoclave to the holding temperature and holding the holding temperature for a predetermined time, and after the holding, raising the temperature of the inside of the autoclave to a curing temperature of the matrix resin to cure the matrix resin, wherein in a case where a plurality of the volatilization temperature regions where volatile components are generated from the prepregs are present, in a lowest low-volatilization temperature region, an upper limit temperature or a near-upper-limit temperature of the low-volatilization temperature region is set as a low holding temperature, and in a high-volatilization temperature region overlapping a temperature region where a viscosity of the prepregs changes so as to increase, a lower limit temperature or a near-lower-limit temperature of the high-volatilization temperature region is set as a high holding temperature, and temperature raising and holding of the inside of the autoclave are performed in order of the low holding temperature and the high holding temperature.

8. The method for forming a composite material structure according to claim 7, wherein the prepregs are laminated on the upper and lower surfaces of the honeycomb core via an adhesive.

9. The method for forming a composite material structure according to claim 8, wherein the adhesive that is cured at a temperature lower than that of the prepregs is used.

10. A method for forming a composite material structure, the method comprising covering an uncured composite material honeycomb sandwich panel in which prepregs are laminated on upper and lower surfaces of a honeycomb core with a vacuum bag, evacuating an inside of the vacuum bag, and disposing, heating, and pressurizing the uncured composite material honeycomb sandwich panel within an autoclave, and curing a matrix resin of each of the prepregs and performing adhesion of the matrix resin to the honeycomb core, the method comprising:

confirming a volatilization temperature region where a volatile component is generated from the prepreg in advance, and setting a holding temperature on the basis of the volatilization temperature region, raising a temperature of an inside of the autoclave to the holding temperature and holding the holding temperature for a predetermined time, and after the holding, raising the temperature of the inside of the autoclave to a curing temperature of the matrix resin to cure the matrix resin, wherein in a case where a plurality of the volatilization temperature regions where volatile components are generated from the prepregs are present, in a lowest low-volatilization temperature region, an upper limit temperature or a near-upper-limit temperature of the low-volatilization temperature region is set as a low holding temperature, and in a high-volatilization temperature region overlapping a temperature region where a viscosity of the prepregs changes so as to increase, a lower limit temperature or a near-lower-limit temperature of the high-volatilization temperature region is set as a high holding temperature, and temperature raising and holding of the inside of the autoclave are performed in order of the low holding temperature and the high holding temperature.

11. The method for forming a composite material structure according to claim 10, wherein the prepregs are laminated on the upper and lower surfaces of the honeycomb core via an adhesive.

* * * * *